United States Patent [19]

Gajewski et al.

[11] 4,195,150

[45] Mar. 25, 1980

[54] NOVEL COMPOSITION FOR PREPARING URETHANE/UREA BLOCK COPOLYMERS

[75] Inventors: Vincent J. Gajewski, Jackson, N.J.; Elliot Eisenbach, New York, N.Y.

[73] Assignee: M & T Chemicals Inc., Woodbridge, N.J.

[21] Appl. No.: 951,176

[22] Filed: Oct. 13, 1978

[51] Int. Cl.$^2$ .............................................. C08G 18/16
[52] U.S. Cl. ..................................................... 528/52
[58] Field of Search ......................................... 528/52

[56] References Cited

U.S. PATENT DOCUMENTS

| | | | |
|---|---|---|---|
| 2,929,800 | 3/1960 | Hill | 260/33.2 R |
| 3,157,621 | 11/1964 | Deggingen | 528/52 |
| 3,487,080 | 12/1969 | Matsui et al. | 528/52 |

*Primary Examiner*—Maurice J. Welsh
*Attorney, Agent, or Firm*—Kenneth G. Wheeless; Robert Spector

[57] ABSTRACT

The reaction between an isocyanate-terminated prepolymer and an aromatic diamine to form an elastomeric urethane-urea copolymer is accelerated using a quaternary ammonium compound as the catalyst. The quaternary ammonium compound is optionally employed in combination with a mono- or polyfunctional carboxylic acid containing from 4 to 20 carbon atoms.

12 Claims, No Drawings

NOVEL COMPOSITION FOR PREPARING URETHANE/UREA BLOCK COPOLYMERS

BACKGROUND OF THE INVENTION

This invention relates to the preparation of elastomeric, polyurethane compositions. More particularly, this invention relates to novel compositions for preparing elastomeric polyurethanes wherein the reagents employed to prepare the polyurethanes include a difunctional amine as the chain extender.

Elastomeric polyurethanes are conventionally prepared by reacting an isocyanate-terminated prepolymer (obtained by reacting a polyol having a functionality of two or higher and a stoichiometric excess of a diisocyanate compound) with an amine as the chain extending agent. The elastomer is believed to be a block copolymer containing both urethane and urea groups.

Up until recently the preferred chain extender was 4, 4'-methylene-bis (2-chloroaniline), which is referred to in the trade as "MOCA". MOCA imparts excellent mechanical strength properties to urethane elastomers, however, the use of this diamine has been severely restricted since regulations appeared in the Federal Register, Vol. 38, No. 144, July 27, 1973. These regulations classify MOCA as a carcinogen and require that strict precautions be exercised during the manufacture, handling and use of this compound. These restrictions have encouraged a search for less objectionable chain extending agents which impart the same level of desirable physical properties as MOCA. U.S. Pat. No. 3,920,617 teaches that sulfur-containing diamines of the general formula

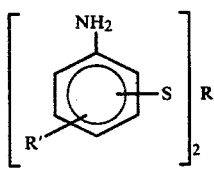

wherein R is alkylene and R' is hydrogen, halogen or a hydrocarbon group are useful chain extending agents for urethane type elastomers, however, the rate at which this class of compounds achieves hardness is considerably slower than the rate achieved using other prior art amine-type chain extending agents such as MOCA. This is a considerable disadvantage in a commercial molding operation, since it increases the time required for the material to become sufficiently cured to allow it to be removed from the mold without permanent deformation or loss of structural integrity. The uncured mixture of isocyanate prepolymer and amine curing agent is usually a liquid of low to moderate viscosity. This liquid is poured into a heated mold wherein it is gradually converted to a solid, crosslinked material. The time interval between filling of the mold and the earliest time at which the object will retain its shape when removed from the mold is known as the "demold time". It is highly desirable to achieve the shortest possible demold time, since this will permit an increase in production rate and a corresponding decrease in production costs.

It is an objective of this invention to decrease the time interval required to convert prepolymers derived from a difunctional isocyanate and a polyol to a non-deformable and demoldable state using any of the conventional aromatic diamines, particularly the class of compounds disclosed in the aforementioned U.S. Pat. No. 3,920,617.

It has now been found that this objective can be achieved using quaternary ammonium compounds as catalysts. A significant decrease in demolding time is achieved with certain prepolymers when the quaternary ammonium compound is employed in combination with a mono- or polyfunctional carboxylic acid containing from 4 to 20 carbon atoms. These acids are conventional catalysts for prior art chain-extending agents such as "MOCA".

SUMMARY OF THE INVENTION

This invention provides a novel composition for preparing elastomeric urethane-urea copolymers, said composition comprising (1) an oligomeric reaction product of a difunctional polyol and a stoichiometric excess of an aromatic diisocyanate wherein the terminal groups of said reaction product are isocyanate groups, (2) a chain extending agent selected from the group consisting of aromatic diamines wherein each amine group is bonded to a carbon atom of an aromatic carbocylic ring, and (3) a catalytically effective amount of a quaternary ammonium compound of the general formula $R_4N^+OR'^-$ wherein each R is individually selected from the group consisting of alkyl and hydroxyalkyl wherein each alkyl or hydroxyalkyl group contains from 1 to 20 carbon atoms, cycloalkyl, aryl, alkaryl and aralkyl, wherein the alkyl portion of said alkaryl or aralkyl groups contain from 1 to 20 carbon atoms and R' is selected from the group consisting of hydrogen, alkyl containing from 1 to 20 carbon atoms and phenyl.

DETAILED DESCRIPTION OF THE INVENTION

The catalysts of this invention are particularly useful for preparing elastomeric urethane-urea block copolymers using the so-called "2-package" method whereby a mixture containing the desired amine chain extender, also referred to as a curing agent is combined with an isocyanate-terminated prepolymer derived from a polyfunctional isocyanate such as one or more of the isomeric tolylene diisocyanates and a polyol.

Among the classes of hydroxyl-terminated polyalkylene polyols that can be included in the present compositions are (1) the polyalkylene ether polyols formed by the polymerization of alkylene oxides such as ethylene and propylene oxides and (2) oligomeric glycols derived from the polymerization of heterocyclic ethers such as tetrahydrofuran. Methods for preparing these polyols are well known in the art. A preferred class of polyether polyols can be represented by the general formula $HO(RO)_xH$ wherein R is alkylene containing two or more carbons or arylalkylene and x is an integer. The value of x represents an average that is preferably equivalent to an average molecule weight from about 500 to 4,000. Polyols having a higher or lower molecular weight may be useful for certain applications.

Polyester polyols are derived from the reaction of a glycol or oligomeric diol such as polypropylene glycol with an aliphatic dicarboxylic acid. Suitable acids include adipic, succinic and sebacic acids. Alternatively, polyester polyols can be prepared by the polymerization of lactones such as $\epsilon$-caprolactone.

The reaction between a given isocyanate-terminated prepolymer and the preferred sulfur-containing aromatic diamines is such that the rate at which this class of compounds achieves hardness is considerably slower than prior art diamine chain extending agents such as MOCA, and the demold times may be many times longer. Carboxylic acids containing four of more carbon atoms, including adipic, azelaic and oleic acids, effectively reduce the demold time of compositions containing prior art curing agents such as MOCA, but are considerably less effective in compositions containing the preferred sulfur-containing diamines. This difference in reactivity is demonstrated in the accompanying examples.

The present ammonium compounds effectively catalyze the reaction between the aforementioned sulfur-containing diamines and isocyanate-terminated prepolymers when employed at concentrations of from about 0.010 to 0.025 parts by weight per 100 parts of prepolymer. At concentrations above about 0.025 parts the ammonium compounds have been shown to reduce the level of physical properties of the cured molded article by as much as 40°% or more relative to products formed from uncatalyzed compositions. The catalyst concentration level at which a decrease in physical properties first becomes apparent will vary somewhat depending upon the type of prepolymer and diamine employed. To ensure that the physical properties of the final product will not be adversely affected to any significant extent the concentration of ammonium compound should not exceed about 0.02%, based on the weight of the isocyanate-terminated prepolymer.

Ammonium compounds that are suitable for use in the present compositions can be represented by the general formula $R_4N^+OR'^-$, wherein each of the R and R' groups are as previously defined. A particularly preferred class of ammonium compounds is disclosed in U.S. Pat. No. 3,892,687. The pertinent portions of this patent are hereby incorporated by reference.

The demold time for compositions containing certain isocyanate-terminated prepolymers, the preferred sulfur-containing diamines and one of the present quaternary ammonium compounds can be reduced without adversely affecting the physical properties of the final molded article if the compositions contain a catalytically effective amount of carboxylic acid containing from 4 to 20 carbon atoms.

The carboxylic acids that can be combined with the present quaternary ammonium compounds contain from four to twenty carbon atoms and can be either monofunctional or bifunctional. Preferred acids include butyric, adipic, azelaic and oleic acids. Suitable carboxylic acids can be represented by the general formulae R'COOH and R"(COOH)$_2$, wherein R' is alkyl or alkenyl and R"is alkylene or alkenylene. R' contains from 2 to 19 carbon atoms and R" contains from 2 to 18 carbon atoms.

The combination of ammonium salt and carboxylic acid that will be most effective in reducing the demold time of elastomeric urethane-urea copolymers prepared using certain prepolymers will depend upon the particular reagents selected, and can be readily determined by routine experimentation.

Unexpectedly it has been found that as the concentration of the present quaternary ammonium catalysts is increased the demold time of the composition reaches a minimum value which subsequently increases with increasing catalyst concentration. The concentration at which the shortest demold time is achieved will be dependent upon the particular prepolymer selected, and can readily be determined with a minimum of experimentation. The optimum catalyst concentrations for typical prepolymers are reported in the accompanying examples.

The ammonium compound is an indispensible part of the catalyst composition when the diamine is one of those disclosed in the aforementioned U.S. Pat. No. 3,920,617. While the presence of the ammonium salt may not be crucial to the operability when the acid catalyst compositions are used with other conventional diamine type curing agents, the presence of these salts has been shown to significantly decrease the demold times of the aforementioned diamines irrespective of whether the salts are used alone or in combination with a carboxylic acid.

The following examples describe the preparation of elastomeric urethane-urea copolymers using preferred prepolymers and catalysts, and should not be interpreted as limiting the scope of the accompanying claims. All parts and percentages are by weight unless otherwise specified.

EXAMPLE 1

Elastomeric urethane-urea copolymers were prepared by reacting 200 g of an isocyanate-terminated prepolymer with 35 g of 1,2-bis (2-aminophenylthio)ethane. The prepolymer had been previously prepared by reacting 2 moles of a commercially available mixture of isomeric tolylene diisocyanates for every mole of polytetramethylene glycol. The resultant product contained approximately 6.3% by weight of unreacted isocyanate groups. Prior to being combined with the diamine the prepolymer was degassed by heating it to 85° C. while maintaining the prepolymer under reduced pressure for several minutes. The diamine (85% of the stoichiometric amount) together with the catalyst was heated to 85° C., at which time it was added to the degassed prepolymer. The time at which these reagents was combined was used as the zero reference point. The resultant mixture was stirred for 40 seconds and then degassed for 1.3 minutes at 85° C. under reduced pressure, after which it was poured into a number of circular mold cavities measuring 1 inch (2.5 cm) in diameter and ⅜ inch (0.95 cm) in height. The mold had been preheated to a temperature of 85° C. The mold was then placed on the lower platen of a hydraulic press that was maintained at 85° C. The surface of the liquid was periodically probed with a metal spatula until it had solidified to the extent that the spatula would not penetrate the surface using moderate pressure. A cover was then placed on the mold and it was subjected to a pressure of 35,000 pounds (15,900 kg) using a 5 inch (12.7 cm) diameter ram. The small amount of polymer which overflowed when the press was closed was tested periodically with a spatula. When the polymer was no longer "tacky", i.e. it did not stick to the spatula, the press was opened and one of the samples was removed. If the sample could be distorted under pressure the press was closed on the mold and samples were removed periodically until the sample under test could not be distorted. The interval between combining of the reagents and removal of the distortion-free samples from the mold is referred to as the demold time in the following table, which contains the demold times obtained using (a) an uncatalyzed mixture of prepolymer and chain extender (b) a mixture of prepolymer, chain extender and 0.05% tetrabutylammonium hydroxide and (c) a mixture of prepolymer, chain extender and 0.025% of a tetrahydroxyalkylammonium hydroxide available as TMR from Air Products and Chemicals, Inc., which was added as a 50% by weight solution in diethylene glycol. The three samples are referred to as a, b and c in the table.

| Sample | Demold Time (minutes) |
|---|---|
| a | 28 |
| b | 7 |
| c | 5 |

These data demonstrate that the demold times of compositions containing a preferred sulfur-containing aromatic diamine can be reduced by as much as 75% using the present ammonium compounds as catalysts.

EXAMPLE 2 (control)

This example demonstrates that only a slight decrease in demold time of compositions containing the preferred diamine employed in Example 1 is observed using carboxylic acids, which effectively catalyze the reaction of isocyanate-terminated prepolymers with certain prior art diamines, including 4,4'-methylene-bis(2-chloroaniline). The test samples were prepared as described in the preceding example with the exception that the mold employed contained six L-shaped cavities wherein each leg of the "L" was 2 inches (5 cm) long, 1 inch (2.5 cm) wide and 0.5 inch (1.8 cm) deep. When the polymer that overflowed from the mold onto the platen of the press was no longer "tacky" the first of the six samples in the mold was removed and tested for fracture resistance by mannually grasping one end of the sample in each hand and applying force in the direction perpendicular to each leg of the "L" shaped sample in an attempt to initiate a fracture at the interior angle formed by the junction of the two legs. If a fracture was initiated the mold containing the remaining five samples was closed and replaced in the press. Samples were removed periodically and tested for fracture resistance as described in the preceding sentence. The time interval between combining the reagents and removal of the first sample which could not be fractured using the aforementioned test is referred to as the demold time for that particular prepolymeramine mixture.

Two reaction mixtures containing 200 grams of an isocyanate-terminated prepolymer and 21 grams of 1,2-bis (2-aminophenylthio)ethane were prepared. The prepolymer had previously been prepared by reacting 1.6 moles of a commercially available mixture of isomeric tolylene diisocyanates for every mole of a polytetramethylene glycol exhibiting an average molecular weight of 1000. The prepolymer contained 4.2% by weight of unreacted isocyanate groups. One of the two reaction mixtures tested contained 0.1% by weight of azelaic acid, a conventional catalyst recommended for use with non-sulfur-containing diamines such as 4,4'-methylene-bis(2-chloroaniline). The second reaction mixture did not contain any catalyst.

The demold time for the catalyst-containing mixture was 39 minutes, and the demold time for the uncatalyzed material was 47 minutes.

For purposes of comparison the foregoing experiment was repeated using 4,4'-methylene-bis(2-chloroaniline) in place of the sulfur-containing diamine. The amount of diamine added to the prepolymer was equivalent to 85% of the number of unreacted isocyanate groups and the temperature of the mold and the press was 100° C. The demold time for the reaction mixture containing the catalyst was 17 minutes, and the demold time for the uncatalyzed mixture was 30 minutes, which is equivalent to a decrease of 43% in demold time. The decrease in demold time using the preferred sulfur-containing diamine employed in the first section of this example was only 17%, compared with a reduction of 75% using one of the quaternary ammonium catalysts described in Example 1.

EXAMPLE 3

This example demonstrates the beneficial effect achieved by using the ammonium catalysts of this invention in combination with a carboxylic acid. The test samples were prepared using the procedure, prepolymer and amine described in the preceding Example 2. The catalyst employed contained 95% by weight of azelaic acid and 5% of the tetrahydroxyalkyl ammonium hydroxide of Example 1, which was added to the reaction mixture as a 50% by weight solution in diethylene glycol. The mixture of catalysts was employed at levels of 0, 0.1, 0.2, 0.3 and 0.4%. The demold times of each of these compositions are contained in the following table.

| Catalyst Concentration (%) | Demold Time (minutes) |
|---|---|
| 0 | 47 |
| 0.1 | 44 |
| 0.2 | 28 |
| 0.3 | 26 |
| 0.4 | 31 |

The data in the table indicate that the demold time reaches a minimum value at a catalyst concentration between 0.2 and 0.4%, and then increases with increasing catalyst concentration. The optimum catalyst concentration can be readily determined for other combinations of prepolymers and diamines with a minimum of experimentation.

By combining the present ammonium compounds with carboxylic acids containing four or more carbon atoms it is possible to achieve commercially useful demold times using less than 0.025% by weight of the ammonium compound. At higher concentrations the ammonium compounds adversely affect the physical properties, including hardness, of the cured copolymer. Hardness is a critical property when the final molded object is subjected to abrasion, such as would be experienced by the wheel of a roller skate. As an example, the Shore hardness value of a cured copolymer prepared using the reagents of this example, determined using the A scale, decreased from 92 at an ammonium salt catalyst concentration of 0.019% to 64 at a concentration of 0.025%. The tensile strength decreased from 4200 psi $(2.95 \times 10^5 g/cm^2)$ to 1800 psi $(1.27 \times 10^5 g/cm^2)$ at the higher catalyst concentration. The tensile strength was measured in accordance with ASTM test procedure D412.

What is claimed is:

1. A novel composition for preparing elastomeric urethane-urea copolymers, said composition comprising (1) an oligomeric reaction product of a difunctional alkylene polyol with a stoichiometric excess of an aromatic diisocyanate such that the terminal groups of said reaction product are isocyanate groups, (2) a chain extending agent selected from the group consisting of aromatic diamines wherein each amine group is bonded to a carbon atom of an aromatic carbocyclic ring, and (3) a catalytically effective amount of a quaternary ammonium compound of the general formula R₄N⁺OR'⁻ wherein each R is individually selected from the group consisting of hydrogen, alkyl and hydroxyalkyl such that each alkyl or hydroxyalkyl group contains from 1 to 20 carbon atoms, cycloalkyl, aryl, alkaryl and aralkyl, wherein the alkyl portion of said alkaryl or aralkyl groups contain from 1 to 20 carbon atoms and R' is selected from the group consisting of hydrogen, alkyl containing from 1 to 20 carbon atoms and phenyl.

2. A novel composition according to claim 1 wherein said polyol is a polyether polyol and the diisocyanate is a mixture of isomeric tolylene diisocyanates.

3. A novel composition according to claim 1 wherein the amine groups of said chain extending agent are bonded to a phenyl group.

4. A novel composition according to claim 3 wherein the chain extending agent exhibits the formula

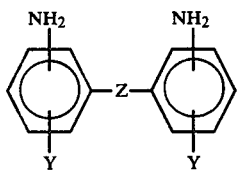

wherein Y is hydrogen or a halogen and Z is alkylene and contains from 1 to 4 carbon atoms or —S—R''—S— wherein R'' is alkylene and contains from 1 to 4 carbon atoms.

5. A novel composition according to claim 1 wherein each R is hydroxyalkyl.

6. A novel composition according to claim 1 wherein R' is hydrogen.

7. In an improved method for preparing an elastomeric urethane-urea copolymer by reacting an isocyanate-terminated prepolymer derived from an alkylene polyol and a stoichiometric excess of an aromatic diisocyanate, with a chain extending agent selected from the group consisting of aromatic diamines wherein each amino group is bonded to a carbon atom of an aromatic carbocyclic ring, the improvement which consists of conducting the reaction in the presence of a catalytically effective amount of a quaternary ammonium compound of the general formula R₄N⁺OR'⁻ wherein each R is individually selected from the group consisting of hydrogen, alkyl and hydroxyalkyl such that each alkyl or hydroxyalkyl group contains from 1 to 20 carbon atoms, cycloalkyl, aryl, alkaryl and aralkyl, wherein the alkyl portion of said alkaryl or aralkyl groups contain from 1 to 20 carbon atoms and R' is selected from the group consisting of hydrogen, alkyl containing from 1 to 20 carbon atoms and phenyl.

8. A method according to claim 7 wherein said polyol is a polyalkylene ether polyol and the diisocyanate is a mixture of isomeric tolylene diisocyanates.

9. A method according to claim 7 wherein the amine groups of said chain extending agent are bonded to a phenyl group.

10. A method according to claim 9 wherein the chain extending agent exhibits the formula

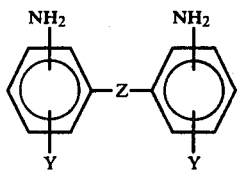

wherein Y is hydrogen or a halogen and Z is alkylene and contains from 1 to 4 carbon atoms or —S—R''—S— wherein R'' is alkylene and contains from 1 to 4 carbon atoms.

11. A method according to claim 7 wherein each R is hydroxyalkyl.

12. A method according to claim 7 wherein R' is hydrogen.

* * * * *